United States Patent
Tomita

(10) Patent No.: US 12,103,474 B2
(45) Date of Patent: Oct. 1, 2024

(54) HARNESS WITH SENSOR

(71) Applicant: Hitachi Metals, Ltd., Tokyo (JP)

(72) Inventor: Kazuhiko Tomita, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 381 days.

(21) Appl. No.: 17/558,675

(22) Filed: Dec. 22, 2021

(65) Prior Publication Data

US 2022/0219627 A1 Jul. 14, 2022

(30) Foreign Application Priority Data

Jan. 12, 2021 (JP) .................. 2021-002797

(51) Int. Cl.
| | |
|---|---|
| *B60R 16/02* | (2006.01) |
| *G01P 1/02* | (2006.01) |
| *H01R 25/00* | (2006.01) |

(52) U.S. Cl.
CPC .......... *B60R 16/0215* (2013.01); *G01P 1/026* (2013.01); *H01R 25/003* (2013.01)

(58) Field of Classification Search
None
See application file for complete search history.

(56) References Cited

U.S. PATENT DOCUMENTS

| | | | |
|---|---|---|---|
| 2017/0153265 A1* | 6/2017 | Yamamoto | ............... G01P 3/443 |
| 2020/0262364 A1* | 8/2020 | Eshima | ................ H01B 7/0045 |

FOREIGN PATENT DOCUMENTS

| | | |
|---|---|---|
| CN | 211789614 U | 10/2020 |
| JP | 201796828 A | 6/2017 |
| JP | 2019-207257 A | 12/2019 |
| JP | 2020112406 A | 7/2020 |

OTHER PUBLICATIONS

Japanese Office Action in JPA No. 2021-002797 issued on Mar. 12, 2024 with English translation thereof.

* cited by examiner

*Primary Examiner* — Ross N Gushi
(74) *Attorney, Agent, or Firm* — MCGINN I.P. LAW GROUP, PLLC.

(57) ABSTRACT

A harness with sensor includes a sensor including a plurality of detection units to detect a physical quantity, a cable including a plurality of electric wires connected to the plurality of sensor units and a sheath collectively covering the plurality of electric wires, and a connector provided at an end portion of the cable opposite to the sensor. The connector includes a plurality of connector-connecting portions to respectively output detection signals of the plurality of sensor units.

16 Claims, 6 Drawing Sheets

HARNESS WITH SENSOR

CROSS-REFERENCE TO RELATED APPLICATIONS

The present patent application claims the priority of Japanese patent application No. 2021-002797 filed on Jan. 12, 2021, and the entire contents of Japanese patent application No. 2021-002797 are hereby incorporated by reference.

TECHNICAL FIELD

The present invention relates to a harness with sensor.

BACKGROUND ART

Patent Literature 1 discloses a harness with sensor that has a wheel speed sensor to detect a wheel rotational speed. The wheel speed sensor described in Patent Literature 1 includes two detection units for the purpose of redundancy and is configured to be able to output detection signals of the two detection units to different control devices. The harness with sensor described in Patent Literature 1 also includes a first cable being connected to one of the detection units and having a first connector at one end, and a second cable being connected to the other detection unit and having a second connector at one end.

CITATION LIST

Patent Literature

Patent Literature 1: JP 2019-207257A

SUMMARY OF THE INVENTION

The harness with sensor described in Patent Literature 1 is configured in such a manner that the two connectorized cables are attached to the wheel speed sensor. Therefore, with the harness with sensor described in Patent Literature 1, cable routing is likely to be complicated.

The invention was made in view of such circumstances and it is an object of the invention to provide a harness with sensor that allows cable routing to be simplified.

So as to achieve the above object, one aspect of the present invention provides a harness with sensor, comprising:
- a sensor comprising a plurality of detection units to detect a physical quantity;
- a cable comprising a plurality of electric wires connected to the plurality of sensor units and a sheath collectively covering the plurality of electric wires; and
- a connector provided at an end portion of the cable opposite to the sensor,
- wherein the connector comprises a plurality of connector-connecting portions to respectively output detection signals of the plurality of sensor units.

Effect of the Invention

According to the present invention, it is possible to provide a harness with sensor that allows cable routing to be simplified.

BEST MODE FOR CARRYING OUT THE INVENTION

Embodiment

An embodiment of the invention will be described in reference to FIGS. 1 to 6. The embodiment below is described as a preferred example for implementing the invention. Although some part of the embodiment specifically illustrates various technically preferable matters, the technical scope of the invention is not limited to such specific aspects.

(General Configuration of Vehicle 10)

Figure 1:
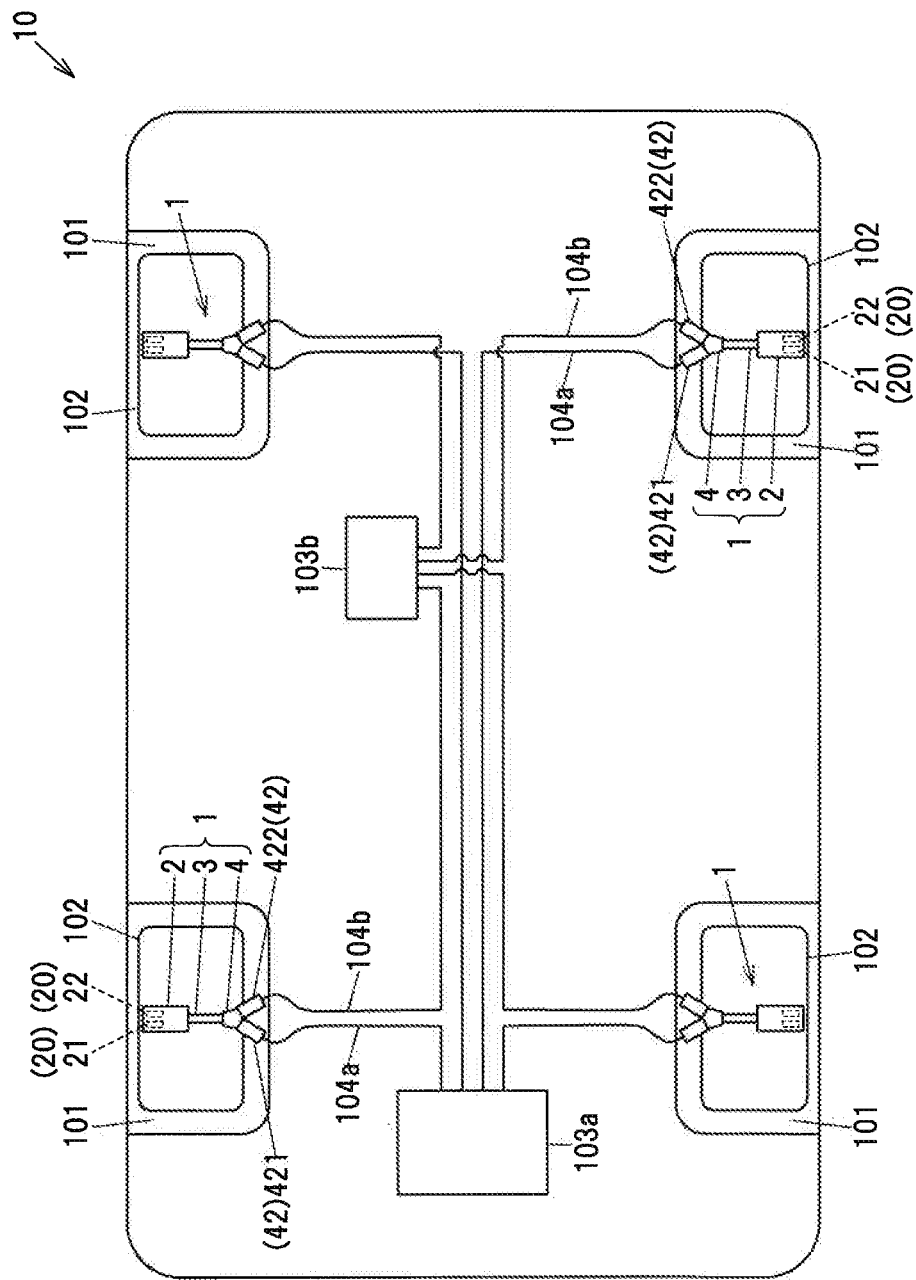
FIG. 1 is a schematic configuration diagram illustrating a vehicle in which harnesses with sensors in an embodiment are installed.

FIG. 1 is a schematic configuration diagram illustrating a vehicle 10 in which harnesses 1 with sensors in the present embodiment are installed. In FIG. 1, the left side is the front of the vehicle 10 and the right side is the rear of the vehicle 10. Four wheel-wells 101 are formed on a body of the vehicle 10, and four wheels 102 on front, rear, right and left sides are respectively arranged in the wheel-wells 101. In each wheel-well 101, the harness 1 with sensor is arranged so as to be entirely housed therein. That is, in the present embodiment, the harness 1 with sensor is arranged at a position at which, e.g., the harness 1 with sensor can be hit by foreign matter such as water or stones thrown up by the wheel 102 when the vehicle is in motion.

The harness 1 with sensor includes a sensor 2 having two detection units 20 to detect a predetermined physical quantity, a cable 3 to transmit respective detection signals of the two detection units 20, and a connector 4 provided at an end portion of the cable 3 opposite to the sensor 2. In the present embodiment, the sensor 2 includes the two detection units 20 for the purpose of redundancy and each of the two detection units 20 detects a rotational speed of the wheel 102. Hereinafter, the sensor 2 is referred to as the wheel speed sensor 2. The wheel speed sensor 2 can constitute, e.g., an anti-lock braking system (ABS). Hereinafter, one of the two detection units 20 of the wheel speed sensor 2 is referred to as a first detection unit 21, the other is referred to as a second detection unit 22, and it is simply referred to as the detection unit 20 when the first detection unit 21 and the second detection unit 22 are not particularly distinguished. The detection signal of each detection unit 20 is transmitted through the cable 3 and output from the connector 4.

The connector 4 has two connector-connecting portions 42: a first connector-connecting portion 421 to output the detection signal of the first detection unit 21, and a second connector-connecting portion 422 to output the detection signal of the second detection unit 22. The first connector-connecting portion 421 is connected to a first control device 103*a* via a first connection cable 104*a*, and the second connector-connecting portion 422 is connected to a second control device 103*b* via a second connection cable 104*b*. That is, the first detection unit 21 and the second detection unit 22 are electrically connected to different control devices.

The first control device 103a is an ECU (Electronic Control Unit) to control mainly operation of the anti-lock braking system, and the second control device 103b is an ECU to control mainly operations of devices other than the anti-lock braking system. The second detection unit 22 and the second control device 103b serve as a backup for operating the anti-lock braking system properly even when a circuit system including the first detection unit 21 and the second control device 103b malfunctions. The first control device 103a is positioned on the front side relative to the center position in a longitudinal direction of the vehicle 10 and the second control device 103b is positioned on the rear side relative to the center position in the longitudinal direction of the vehicle 10, but arrangement of these two control devices in the vehicle 10 is not limited thereto.

(Harness 1 with Sensor)

As shown in FIG. 1, one harness 1 with sensor is arranged inside each wheel-well 101 and there are a total of four harnesses 1 with sensors. The following description will be for only one harness 1 with sensor since the four harnesses 1 with sensors have the same configuration in the present embodiment.

Figure 2:
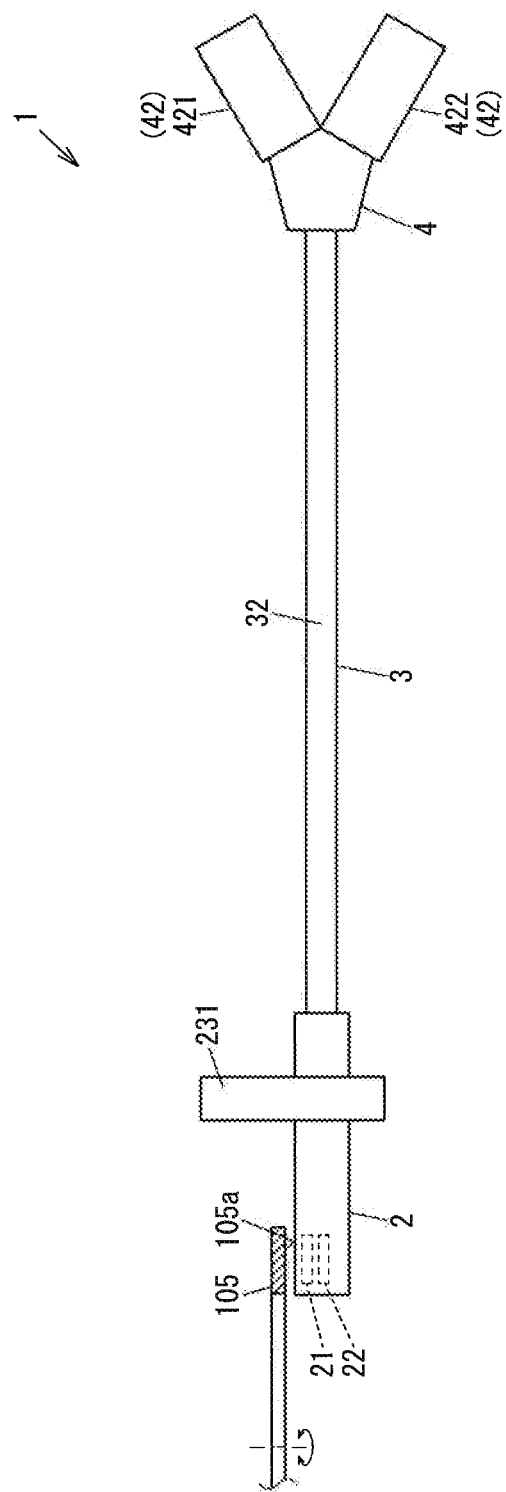
FIG. 2 is a plan view showing the harness with sensor in the embodiment.
Figure 3:
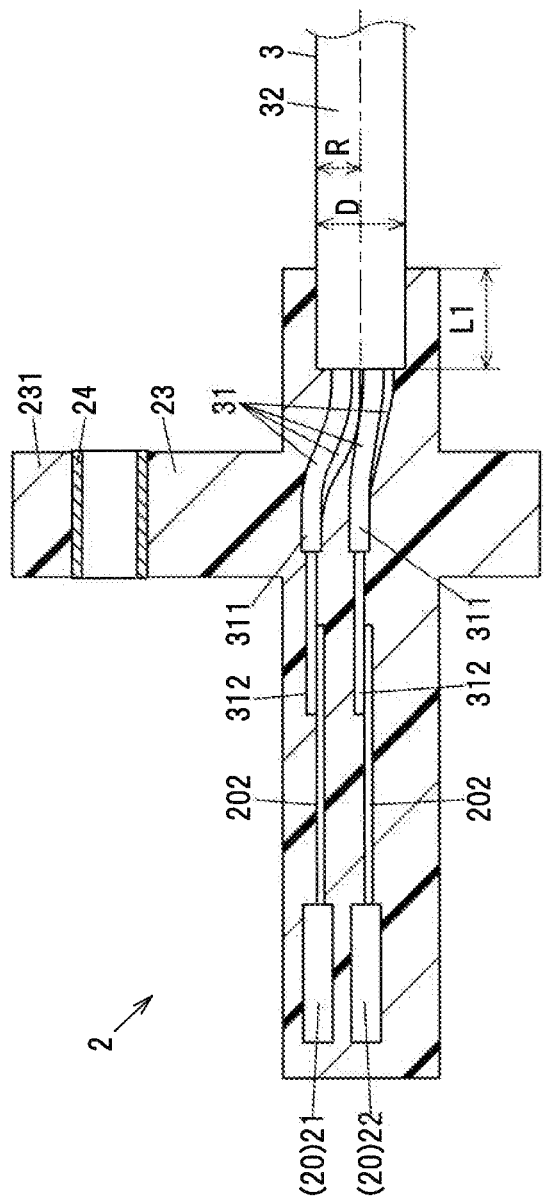
FIG. 3 is a cross-sectional view showing a wheel speed sensor in the embodiment.

FIG. 2 is a plan view showing the harness 1 with sensor in the present embodiment. FIG. 3 is a cross-sectional view showing the wheel speed sensor 2. The harness 1 with sensor includes the wheel speed sensor 2, the cable 3 having four electric wires 31 connected to the two detection units 20 and a sheath 32 collectively covering the four electric wires 31, and the connector 4 provided at an end portion of the cable 3 opposite to the wheel speed sensor 2.

The wheel speed sensor 2 includes the two detection units 20 which are the first detection unit 21 and the second detection unit 22, and a sensor housing 23 holding the two detection units 20. As shown in FIG. 2, the two detection units 20 are arranged near an annular magnetic encoder 105 that rotates with the wheel 102. One surface of the magnetic encoder 105 is a magnetized surface 105a which is magnetized with N-poles and S-poles alternately in a circumferential direction.

Figure 4:
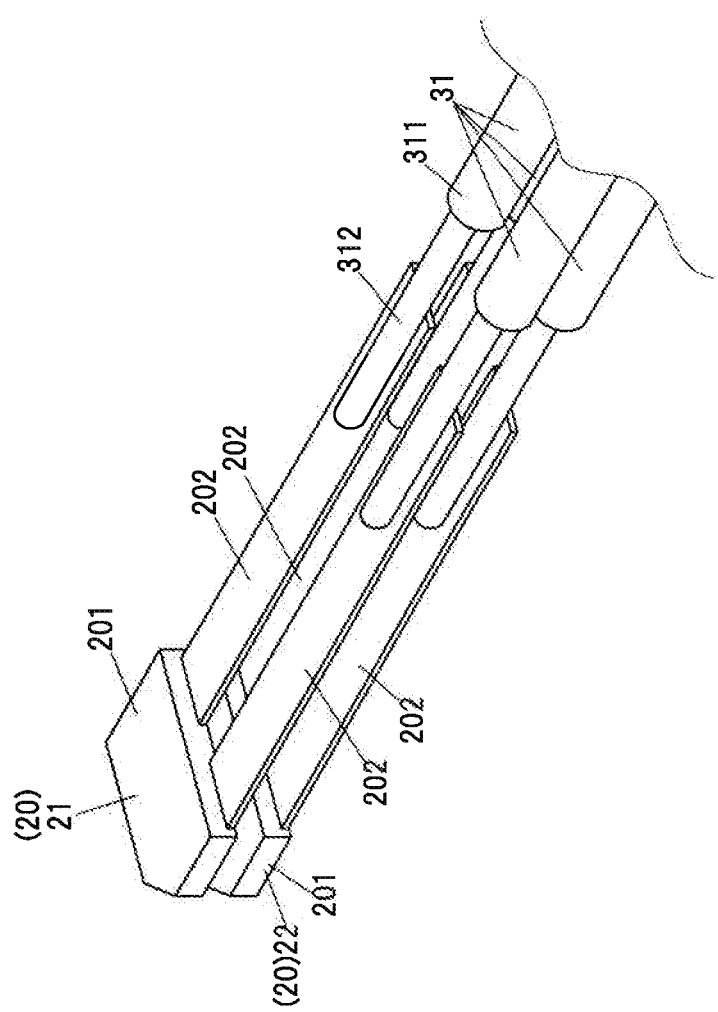
FIG. 4 is a perspective view showing two detection units and four electric wires in the embodiment.

FIG. 4 is a perspective view showing the two detection units 20 and the four electric wires 31. Each detection unit 20 includes a detector main body 201 having a magnetism detection element (not shown) therein, and a pair of lead terminals 202 extending out of the detector main body 201. The detector main bodies 201 of the two detection units 20 are positioned to overlap with each other in their thickness direction. A main surface of each detection unit 20 is arranged to face the magnetized surface 105a of the magnetic encoder 105 (see FIG. 2). The magnetism detection element (not shown) of the detector main body 201 outputs an electric signal according to a cycle of change in magnetic field caused by rotation of the magnetic encoder 105. As the magnetism detection element, it is possible to use, e.g., a Hall element, a GMR (Giant Magneto-Resistance) element, a TMR (Tunneling Magneto-Resistance) element, etc. The detection signal of the magnetism detection element is output through the pair of lead terminals 202.

As shown in FIG. 4, the pair of lead terminals 202 extending out of the detector main body 201 extend on the same side of the detector main body 201 so as to be parallel to each other. Each of the pair of lead terminals 202 is formed in a lengthy elongated plate shape that has a thickness in the thickness direction of the detector main body 201 and is long in a direction of extending from the detector main body 201. Each of the four lead terminals 202 extending out of the detector main bodies 201 is electrically connected to a different electric wire 31 of the cable 3. As shown in FIG. 3, connecting portions between the four lead terminals 202 and the four electric wires 31 are embedded in the sensor housing 23.

As shown in FIG. 3, the two detection units 20, portions of the four electric wires 31 exposed from the sheath 32 on the wheel speed sensor 2 side, an end portion of the sheath 32 on the wheel speed sensor 2 side and a collar 24 (described later) are embedded in the sensor housing 23. The sensor housing 23 is formed by insert molding performed in such a manner that the two detection units 20, the portions of the four electric wires 31 exposed from the sheath 32 on the wheel speed sensor 2 side, the end portion of the sheath 32 on the wheel speed sensor 2 side and the collar 24 are placed in a mold for forming the sensor housing 23 and a resin constituting the sensor housing 23 is injected into the mold. The sensor housing 23 comes into tight contact with the sheath 32 of the cable 3 due to its molding shrinkage, and the sealing property between the sensor housing 23 and the cable 3 is thereby ensured. A length L1 of the portion of the sheath 32 embedded in the sensor housing 23, which is a length in the axial direction of the sheath 32, is not less than a radius R of the cable 3, and it is not less than a diameter D of the cable 3 (i.e., a diameter of the sheath 32) in the present embodiment. This makes it easier to ensure the sealing property between the sensor housing 23 and the cable 3.

The sensor housing 23 has a flange 231 that is located at a center portion in a longitudinal direction of the sensor housing 23 (a horizontal direction in FIG. 3) and protrudes in a direction orthogonal to this longitudinal direction. The collar 24 made of a metal is embedded in the flange 231. A bolt is inserted into the collar 24 and is screwed into an attachment target to which the wheel speed sensor 2 is attached (e.g., a hub or knuckle arranged inside the wheel-well 101), and the wheel speed sensor 2 is thereby bolted to the attachment target.

Figure 5:
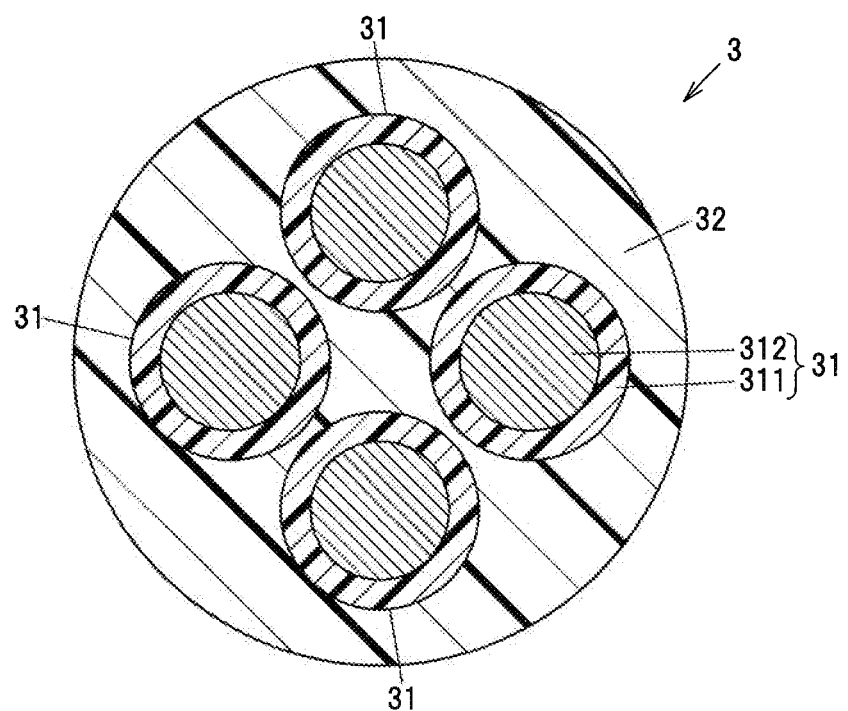
FIG. 5 is a cross-sectional view showing a cable in the embodiment.

FIG. 5 is a cross-sectional view showing the cable 3. The cable 3 has the four electric wires 31 and the sheath 32 collectively covering the four electric wires 31 except both end portions. The electric wire 31 is a covered electrical wire formed by covering a center conductor 312 with an insulation coating 311 having electrical insulating properties. The center conductor 312 is a stranded conductor formed by twisting plural strands made of a high electrically conductive material such as copper. The insulation coating 311 is made of, e.g., a flame-retardant cross-linked polyethylene, but it is not limited thereto and may be made of a non-flame-retardant material. The four electric wires 31 are twisted together inside the sheath 32. The sheath 32 is solid throughout the entire length and directly covers the four electric wires 31. In other words, the four electric wires 31 are embedded in the sheath 32. The sheath 32 is formed of, e.g., a thermoplastic urethane. The cable 3 is fixed to, e.g., a wall portion of the vehicle body defining the wheel-well 101 and is arranged along this wall portion.

As shown in FIG. 3, the center conductors 312 are exposed at end portions of the four electric wires 31 on the wheel speed sensor 2 side by stripping the insulation coatings 311 and the exposed portions of the center conductors 312 are electrically connected to the lead terminals 202 of the wheel speed sensor 2. Meanwhile, end portions of the four electric wires 31 on the connector 4 side are electrically connected to different terminal fittings 41 of the connector 4, as shown in FIG. 6 which will be described later.

Figure 6:
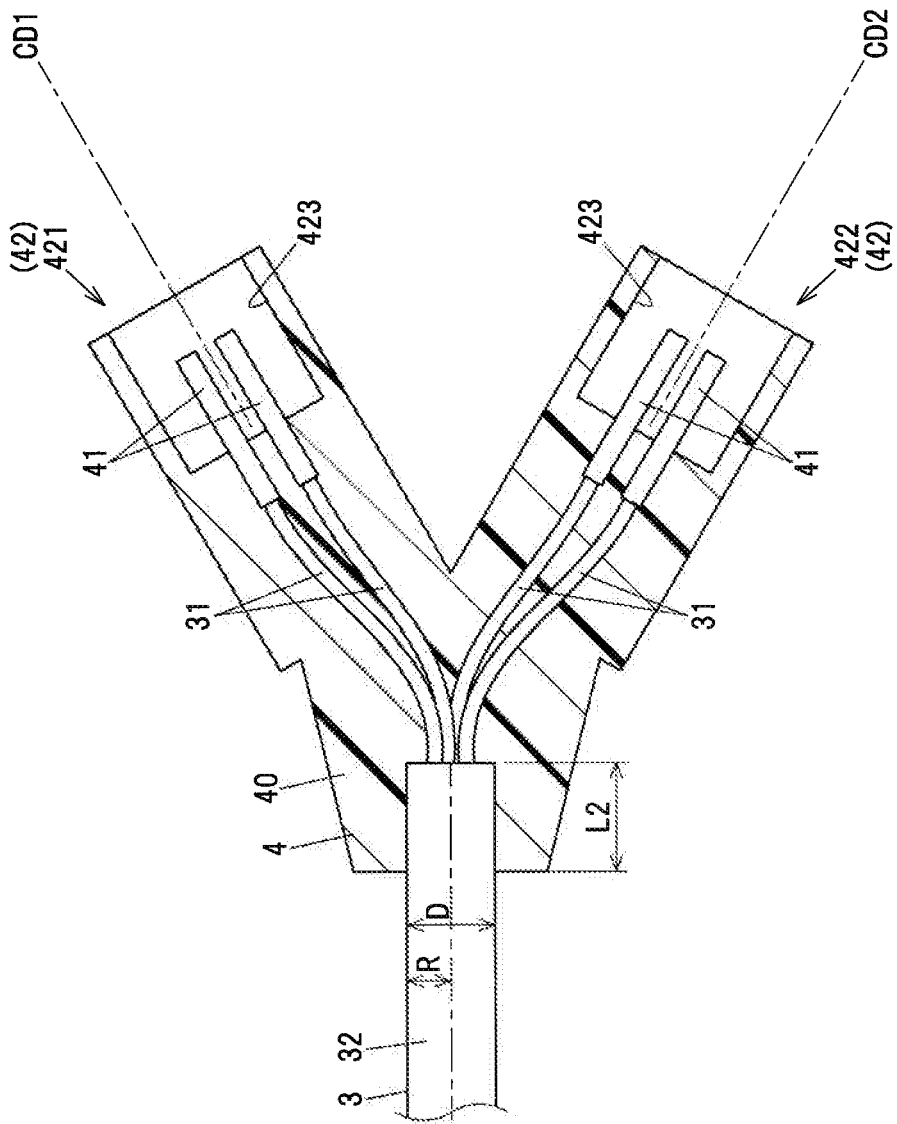
FIG. 6 is a cross-sectional view showing a connector in the embodiment.

FIG. 6 is a cross-sectional view showing the connector 4. The connector 4 includes a connector housing 40 and four terminal fittings 41. A portion of each of the four terminal fittings 41, portions of the four electric wires 31 exposed from the sheath 32 on the connector 4 side, and an end portion of the sheath 32 on the connector 4 side are embedded in the connector housing 40. The connector housing 40 is formed by insert molding performed in such a manner that the four terminal fittings 41, the portions of the four electric wires 31 exposed from the sheath 32 on the connector 4 side, and the end portion of the sheath 32 on the connector 4 side are placed in a mold for forming the connector housing 40 and a resin constituting the connector housing 40 is injected into the mold. The connector housing 40 comes into tight contact with the cable 3 due to its molding shrinkage, and the sealing property between the connector housing 40 and the cable 3 is thereby ensured. A length L2 of the portion of the sheath 32 embedded in the connector housing 40, which is a length in the axial direction of the sheath 32, is not less than the radius R of the cable 3, and it is not less than the diameter D of the cable 3 in the present embodiment. In addition, although it is not shown in the drawing, the terminal fittings 41 are crimped onto end portions of the electric wires 31 and are thereby electrically connected (continuous) to the electric wires 31. The terminal fittings 41 are partially embedded in the connector housing 40 and are thereby held by the connector housing 40.

The connector 4 has two connector-connecting portions 42 (i.e., the first connector-connecting portion 421 and the second connector-connecting portion 422) that respectively output the detection signals of the two detection units 20. In the present embodiment, the two connector-connecting portions 42 have the same shape. Each connector-connecting portion 42 includes a fitting recess 423 formed on the connector housing 40 and a pair of terminal fittings 41 protruding into the fitting recess 423. The fitting recess 423 is a recessed portion formed so that another connector is fitted thereto.

The pair of terminal fittings 41 of the first connector-connecting portion 421 are electrically connected, via a pair of electric wires 31 respectively connected thereto, to the pair of lead terminals 202 of the first detection unit 21. The pair of terminal fittings 41 of the second connector-connecting portion 422 are electrically connected, via a pair of electric wires 31 respectively connected thereto, to the pair of lead terminals 202 of the second detection unit 22. This provides a configuration in which the first connector-connecting portion 421 outputs an output signal (detection signal) of the first detection unit 21 and the second connector-connecting portion 422 outputs the detection signal of the second detection unit 22. It is also configured such that the first connector-connecting portion 421 and the second connector-connecting portion 422 are connected to different connection targets.

Another connector to be connected to the first connector-connecting portion 421 is a connector provided at an end portion of the first connection cable 104a (see FIG. 1) that connects the first connector-connecting portion 421 and the first control device 103a, and another connector to be connected to the second connector-connecting portion 422 is the connector 4 provided at an end portion of the second connection cable 104b (see FIG. 1) that connects the second connector-connecting portion 422 and the second control device 103b. However, it is not limited thereto. For example, one of the two connector-connecting portions 42 may be directly connected to the connector 4 provided on the control device 103.

As shown in FIG. 6, in the present embodiment, a connection direction CD1 between the first connector-connecting portion 421 and the other connector to be connected to the first connector-connecting portion 421 (i.e., an opening direction of the fitting recess 423 of the first connector-connecting portion 421) and a connection direction CD2 between the second connector-connecting portion 422 and the other connector to be connected to the second connector-connecting portion 422 (i.e., an opening direction of the fitting recess 423 of the second connector-connecting portion 422) are different from each other. It is thereby easy to suppress contact between the two other connectors to be connected to the two connector-connecting portions 42. From this point of view, an angle formed by the connection direction CD1 and the connection direction CD2 is preferably, e.g., not less than 30° and not more than 150°. However, it is not limited thereto, and the connection directions between the two connector-connecting portions 42 and the other connectors may be parallel to each other as long as the two other connectors connected to the two connector-connecting portions 42 do not contact with each other.

The connector 4 is fixed, directly or via another member, to the wall portion of the vehicle body defining the wheel-well 101 even though it is not shown in the drawing. However, it is not limited thereto, and the connector 4 may be fixed to a wall portion of the vehicle body outside the wheel-well 101.

Functions and Effects of the Embodiment

The harness 1 with sensor in the present embodiment includes the wheel speed sensor 2 having the two detection units 20, the cable 3 having the four electric wires 31 connected to the two detection units 20 and the sheath 32 collectively covering the four electric wires 31, and the connector 4 provided at the end portion of the cable 3 opposite to the wheel speed sensor 2. In addition, the connector 4 includes the two connector-connecting portions 42 that respectively output the detection signals of the two detection units 20. Therefore, it is possible to avoid arranging plural cables 3 in parallel in a wiring route from the wheel speed sensor 2 to the connector 4 and it is possible to simplify cable routing. That is, when arranging plural cables 3 in parallel in the wiring route from the wheel speed sensor 2 to the connector 4, it causes problems that, e.g., it becomes necessary to bundle the plural cables 3 or a diameter of the bundled cables 3 is large, but such problems can be solved according to the present embodiment. Particularly in the present embodiment, the wheel speed sensor 2 and the connector 4 are connected by one cable 3, and it is easier to simplify the cable routing.

In addition, one end portion of the sheath 32 is embedded in the sensor housing 23 and the other end portion of the sheath 32 is embedded in the connector housing 40. Therefore, it is possible to prevent the four electric wires 31 of the cable 3 from being exposed to the outside. It is thereby possible to prevent foreign matter such as water from adhering to the four electric wires 31 or prevents a decrease in durability of the cable 3 caused by exposing the electric wires 31 which have relatively low strength.

In addition, the connection directions CD1 and CD2 between the two connector-connecting portions 42 and the respectively corresponding other connectors are different from each other. Therefore, the two other connectors respectively connected to the two connector-connecting portions 42 are prevented from coming into contact with each other, and it is thereby possible to improve working efficiency when connecting the connector-connecting portions 42 to the other connectors.

In addition, the sheath 32 is solid and directly covers the four electric wires 31. Therefore, it is possible to reduce the diameter of the cable 3 as compared to when, e.g., a pair of the electric wires 31 connected to the first detection unit 21 are covered with a first cover member, a pair of the electric wires 31 connected to the second detection unit 22 are covered with a second cover member, and these first and second cover members are collectively covered with the sheath 32. In addition, when the connector housing 40 or the sensor housing 23 is molded with an end portion of the cable 3 inserted in the respective mold, a resin to form the connector housing 40 or the sensor housing 23 can be prevented from entering the inside of the sheath 32 and it is easy to manufacture the harness 1 with sensor.

In addition, in the present embodiment, plural connector-connecting portions 42 have the same shape. Therefore, as a temporary solution in the event that, e.g., the first detection unit 21 fails to function, the other connectors connected to the two connector-connecting portions 42 can be swapped and reconnected so that the properly functioning second detection unit 22 can be connected to the first control device 103a (i.e., the main control device).

As described above, according to the present embodiment, it is possible to provide a harness with sensor that allows cable routing to be simplified.

Summary of the Embodiment

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A harness with sensor (1), comprising: a sensor (2) comprising a plurality of detection units (20) to detect a physical quantity; a cable (3) comprising a plurality of electric wires (31) connected to the plurality of sensor units (20) and a sheath (32) collectively covering the plurality of electric wires (31); and a connector (4) provided at an end portion of the cable (3) opposite to the sensor (2), wherein the connector (4) comprises a plurality of connector-connecting portions (42) to respectively output detection signals of the plurality of sensor units (20).

[2] The harness with sensor (1) described in [1], wherein the sensor (2) comprises a sensor housing (23) holding the plurality of sensor units (20), wherein the connector (4) comprises a connector housing (40) holding a plurality of terminal fittings (41) respectively connected to the plurality of electric wires (31), wherein one end of the sheath (32) is embedded in the sensor housing (23), and wherein the other end of the sheath (32) is embedded in the connector housing (40).

[3] The harness with sensor (1) described in [1] or [2], wherein connection directions (CD1, CD2) between the plurality of connector-connecting portions (42) and respectively corresponding other connectors are different from each other.

[4] The harness with sensor (1) described in any one of [1] to [3], wherein the sheath (32) is solid and directly covers the plurality of electric wires (31).

[5] The harness with sensor (1) described in any one of [1] to [4], wherein each of the plurality of detection units (20) detects a rotational speed of a wheel.

Although the embodiment of the invention has been described, the invention according to claims is not to be limited to the embodiment described above. Further, please note that not all combinations of the features described in the embodiment are necessary to solve the problem of the invention. In addition, the invention can be appropriately modified and implemented without departing from the gist thereof.

For example, in the embodiment described above, the wheel speed sensor and the connector may be connected by plural cables connected in series.

In addition, although the example in which two detection units are provided in the wheel speed sensor has been described in the embodiment described above, it is not limited thereto and, e.g., not less than three detection units may be provided. In this case, the electric wires provided in the cable are twice as many as the number of the detection units, and the connector-connecting portions provided on the connector are the same number as the number of the detection units and respectively output the detection signals of the detection units.

In addition, although the plural detection units of the sensor are to detect a wheel rotational speed in the embodiment described above, it is not limited thereto and the plural detection units may have different functions. For example, it may be configured such that one detection unit detects wheel rotational speed and another detection unit detects temperature.

In addition, although the two connector-connecting portions have the same shape in the embodiment described above, it is not limited thereto and the plural connector-connecting portions can have different shapes. In this case, it is possible to prevent erroneous fitting.

The invention claimed is:

1. A harness with sensor, comprising:
a sensor comprising a plurality of detection units to detect a physical quantity;
a cable comprising a plurality of electric wires connected to the plurality of sensor units and a sheath collectively covering the plurality of electric wires; and
a connector provided at an end portion of the cable opposite to the sensor,
wherein the connector comprises;
a plurality of connector-connecting portions to respectively output detection signals of the plurality of sensor units; and
a connector housing holding a plurality of terminal fittings respectively connected to the plurality of electric wires, and
wherein the connector housing comprises:
a plurality of terminal fitting accommodating portions respectively accommodating the plurality of terminal fittings; and
a sheath accommodating portion accommodating the sheath and comprising a resin integrally molded with the plurality of terminal fitting accommodating portions.

2. The harness with sensor according to claim 1, wherein the sensor comprises a sensor housing holding the plurality of sensor units,
wherein one end of the sheath is embedded in the sensor housing, and
wherein the other end of the sheath is embedded in the connector housing.

3. The harness with sensor according to claim 1, wherein the sheath is solid and directly covers the plurality of electric wires.

4. The harness with sensor according to claim 1, wherein each of the plurality of detection units detects a rotational speed of a wheel.

5. The harness with sensor according to claim 1, wherein the plurality of terminal fittings are partially embedded in the connector housing.

6. The harness with sensor according to claim 1, wherein the plurality of terminal fittings are held by the connector housing.

7. The harness with sensor according to claim 1, wherein the plurality of connector-connecting portions provided on the connector are a same number as a number of the plurality of detection units and respectively output the detection signals of the detection units.

8. The harness with sensor according to claim 1, wherein one of the plurality of detection units detects temperature.

9. The harness with sensor according to claim 1, wherein one of the plurality of detection units detects temperature, and wherein a second of the plurality of detection units detects a rotational speed of a wheel.

10. The harness with sensor according to claim 1, wherein each of the plurality of connector-connecting portions have a same shape.

11. The harness with sensor according to claim 1, wherein each of the plurality of connector-connecting portions have a different shape.

12. The harness with sensor according to claim 1, wherein connection directions between the plurality of connector-connecting portions and respectively corresponding other connectors are different from each other.

13. The harness with sensor according to claim 12, wherein an angle formed by the connection directions between the plurality of connector-connecting portions is not less than 30° and not more than 150°.

14. The harness with sensor according to claim 12, wherein the connection directions between the plurality of connector-connecting portions are parallel to each other.

15. The harness with sensor according to claim 1, wherein the plurality of electric wires provided in the cable are twice as many as a number of the plurality of detection units.

16. The harness with sensor according to claim 15, wherein the plurality of connector-connecting portions provided on the connector are a same number as the number of the plurality of detection units and respectively output the detection signals of the detection units.

* * * * *